(12) United States Patent
Miyazaki

(10) Patent No.: US 10,180,783 B2
(45) Date of Patent: Jan. 15, 2019

(54) INFORMATION PROCESSING DEVICE, INFORMATION PROCESSING METHOD AND PROGRAM THAT CONTROLS MOVEMENT OF A DISPLAYED ICON BASED ON SENSOR INFORMATION AND USER INPUT

(71) Applicant: SONY CORPORATION, Tokyo (JP)

(72) Inventor: Reiko Miyazaki, Tokyo (JP)

(73) Assignee: SONY CORPORATION, Tokyo (JP)

( * ) Notice: Subject to any disclaimer, the term of this patent is extended or adjusted under 35 U.S.C. 154(b) by 331 days.

(21) Appl. No.: 14/360,390

(22) PCT Filed: Oct. 25, 2012

(86) PCT No.: PCT/JP2012/006844
§ 371 (c)(1),
(2) Date: May 23, 2014

(87) PCT Pub. No.: WO2013/080431
PCT Pub. Date: Jun. 6, 2013

(65) Prior Publication Data
US 2014/0317545 A1 Oct. 23, 2014

(30) Foreign Application Priority Data
Dec. 1, 2011 (JP) .................. 2011-263238

(51) Int. Cl.
*G06F 3/0486* (2013.01)
*G06F 3/0488* (2013.01)
(Continued)

(52) U.S. Cl.
CPC .......... *G06F 3/0486* (2013.01); *G06F 3/0346* (2013.01); *G06F 3/0482* (2013.01);
(Continued)

(58) Field of Classification Search
CPC ..................................... G06F 3/0486
(Continued)

(56) References Cited

U.S. PATENT DOCUMENTS 5,231,578 A * 7/1993 Levin .................... G06F 3/0481
715/203
8,977,987 B1 * 3/2015 Korn ....................... G06F 3/016
715/702

(Continued)

FOREIGN PATENT DOCUMENTS

JP 2009-294850 A 12/2009
JP 2009-294850 A5 12/2009
(Continued)

OTHER PUBLICATIONS

U.S. Appl. No. 14/232,728, filed Jan. 14, 2014, 2014-0168129, Miyazaki, et al.
(Continued)

*Primary Examiner* — Doon Y Chow
*Assistant Examiner* — Conrad R Pack
(74) *Attorney, Agent, or Firm* — Xsensus, LLP

(57) ABSTRACT

An information processing apparatus including a processor that receives an output from a user interface indicating that a first icon is selected; acquires sensor information corresponding to movement of the information processing apparatus; and controls a display to move at least a second icon on the display based on the acquired sensor information corresponding to the movement of the information processing apparatus upon receiving the output from the user interface that the first icon is selected.

24 Claims, 9 Drawing Sheets

(51) Int. Cl.
*G06F 3/0481* (2013.01)
*G06F 3/0346* (2013.01)
*G06F 3/0482* (2013.01)

(52) U.S. Cl.
CPC ........ *G06F 3/0488* (2013.01); *G06F 3/04817* (2013.01); *G06F 3/04883* (2013.01)

(58) Field of Classification Search
USPC .......................................................... 715/769
See application file for complete search history.

(56) References Cited

U.S. PATENT DOCUMENTS

| | | | | |
|---|---|---|---|---|
| 9,626,098 | B2* | 4/2017 | Migos | G06F 3/04883 |
| 2001/0007980 | A1* | 7/2001 | Ishibashi | G06F 1/1626 |
| | | | | 705/14.4 |
| 2003/0007017 | A1* | 1/2003 | Laffey | G06F 3/04842 |
| | | | | 715/862 |
| 2008/0170789 | A1* | 7/2008 | Thacker | G06F 3/0481 |
| | | | | 382/186 |
| 2008/0235610 | A1* | 9/2008 | Dettinger | G06F 3/0486 |
| | | | | 715/769 |
| 2008/0246778 | A1 | 10/2008 | Ham et al. | |
| 2009/0122018 | A1* | 5/2009 | Vymenets | G06F 3/04817 |
| | | | | 345/173 |
| 2009/0207184 | A1* | 8/2009 | Laine | G06F 1/1626 |
| | | | | 345/619 |
| 2010/0138784 | A1* | 6/2010 | Colley | G06F 3/04883 |
| | | | | 715/810 |
| 2011/0059775 | A1* | 3/2011 | Choi | G06F 1/1694 |
| | | | | 455/566 |
| 2011/0086192 | A1 | 4/2011 | Lin et al. | |
| 2011/0169868 | A1* | 7/2011 | Amemiya | G06F 1/1626 |
| | | | | 345/676 |
| 2011/0193788 | A1 | 8/2011 | King et al. | |
| 2011/0197153 | A1* | 8/2011 | King | G06F 3/04883 |
| | | | | 715/769 |
| 2011/0221664 | A1* | 9/2011 | Chen | G06F 3/017 |
| | | | | 345/156 |
| 2011/0254792 | A1* | 10/2011 | Waters | G06F 1/1626 |
| | | | | 345/173 |
| 2011/0291929 | A1* | 12/2011 | Yamada | A63F 13/04 |
| | | | | 345/158 |
| 2012/0326994 | A1* | 12/2012 | Miyazawa | G06F 3/0346 |
| | | | | 345/173 |
| 2014/0168129 | A1 | 6/2014 | Miyazaki et al. | |
| 2015/0242092 | A1* | 8/2015 | Van Os | G06F 3/04817 |
| | | | | 715/765 |

FOREIGN PATENT DOCUMENTS

| | | |
|---|---|---|
| JP | 2010-086192 | 4/2010 |
| JP | 2011-141825 A | 7/2011 |
| WO | WO 2010/076772 A2 | 7/2010 |

OTHER PUBLICATIONS

International Search Report dated Mar. 1, 2013 in PCT/JP2012/006844.
Office Action dated Nov. 4, 2015 in Japanese Patent Application No. 2011-263238.
Office Action dated Jan. 12, 2016 in Japanese Patent Application No. 2011-263238.
Combined Chinese Office Action and Search Report dated Sep. 5, 2016 in Patent Application No. 201210484223.0 (with English translation).

* cited by examiner

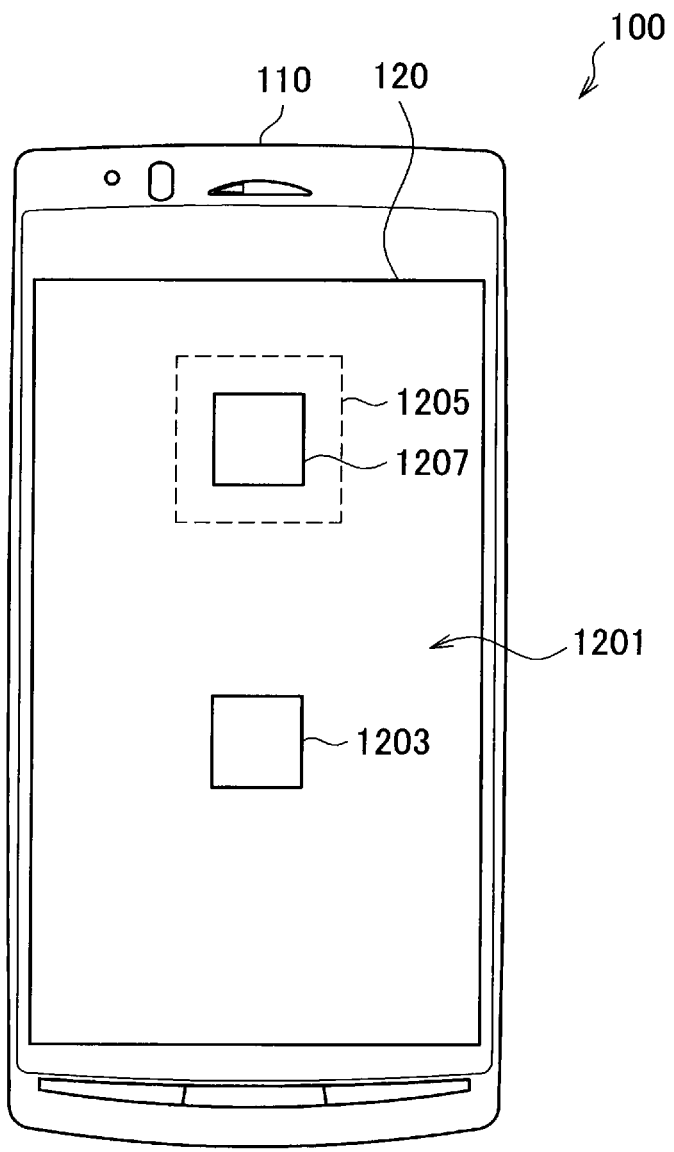
[Fig. 1]

[Fig. 2]
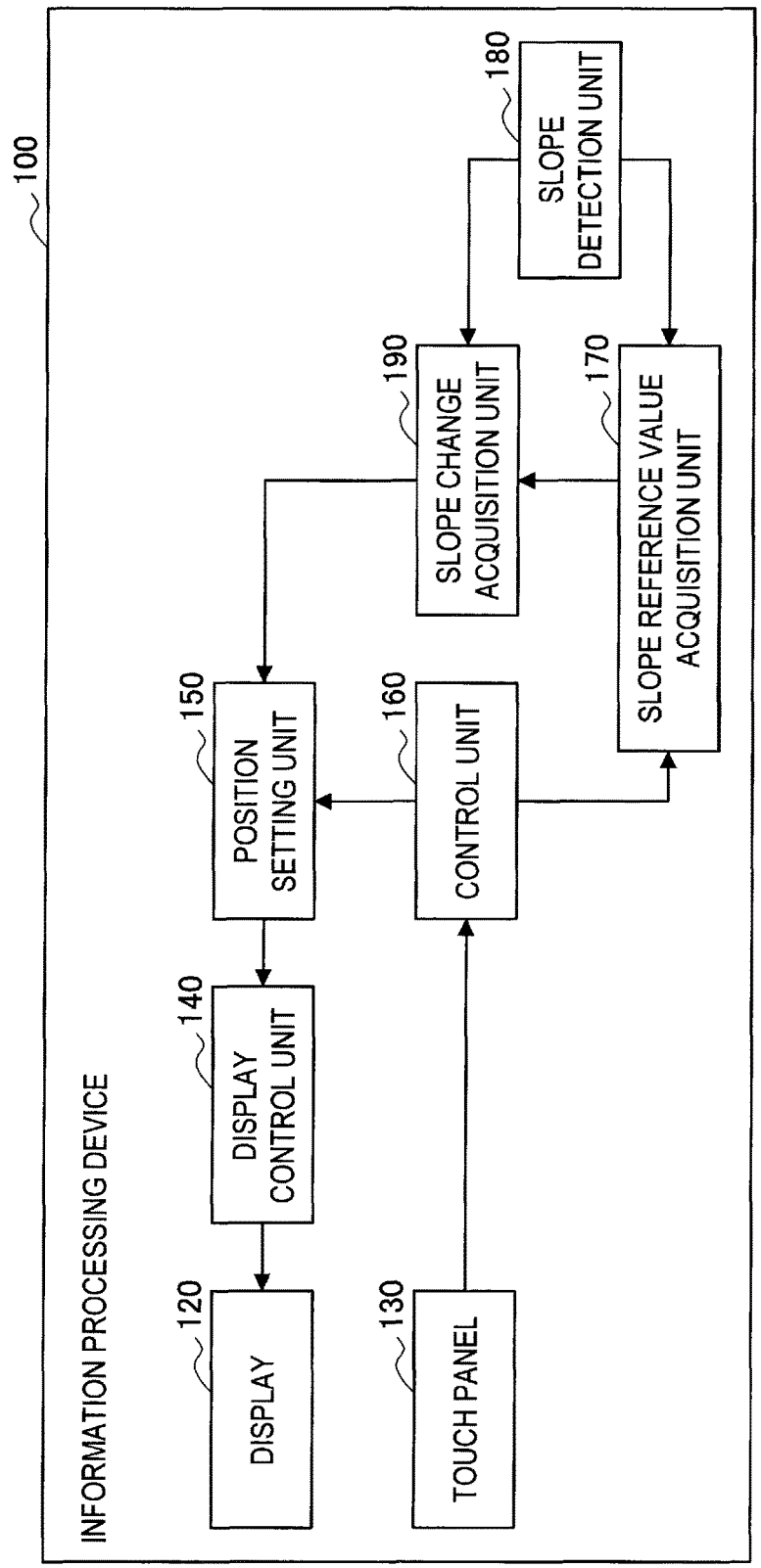

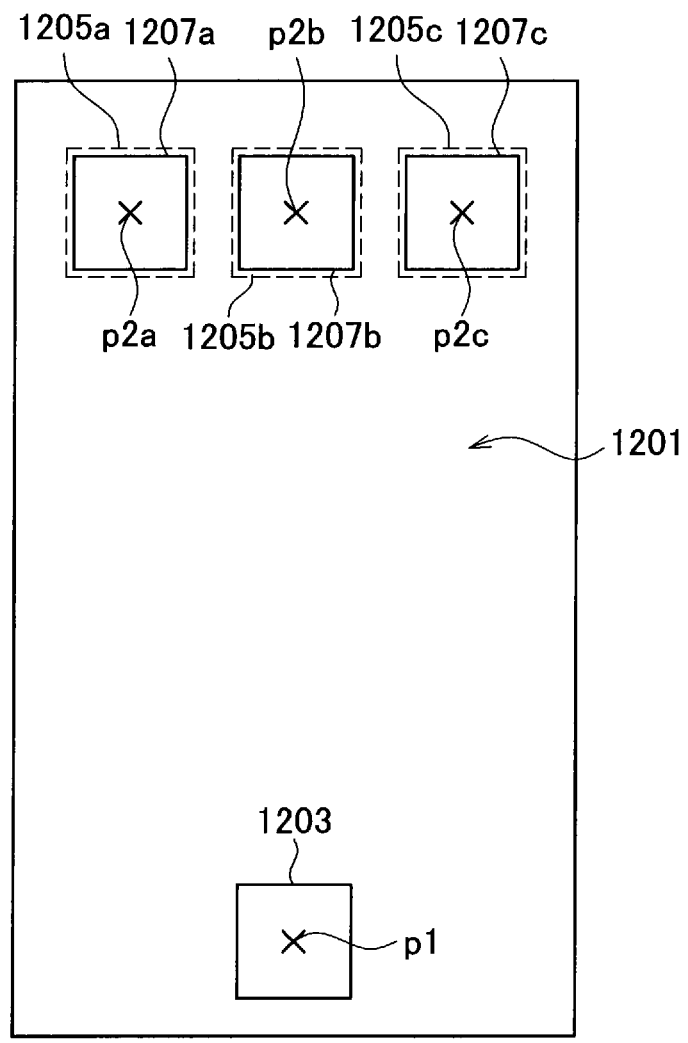
[Fig. 3]

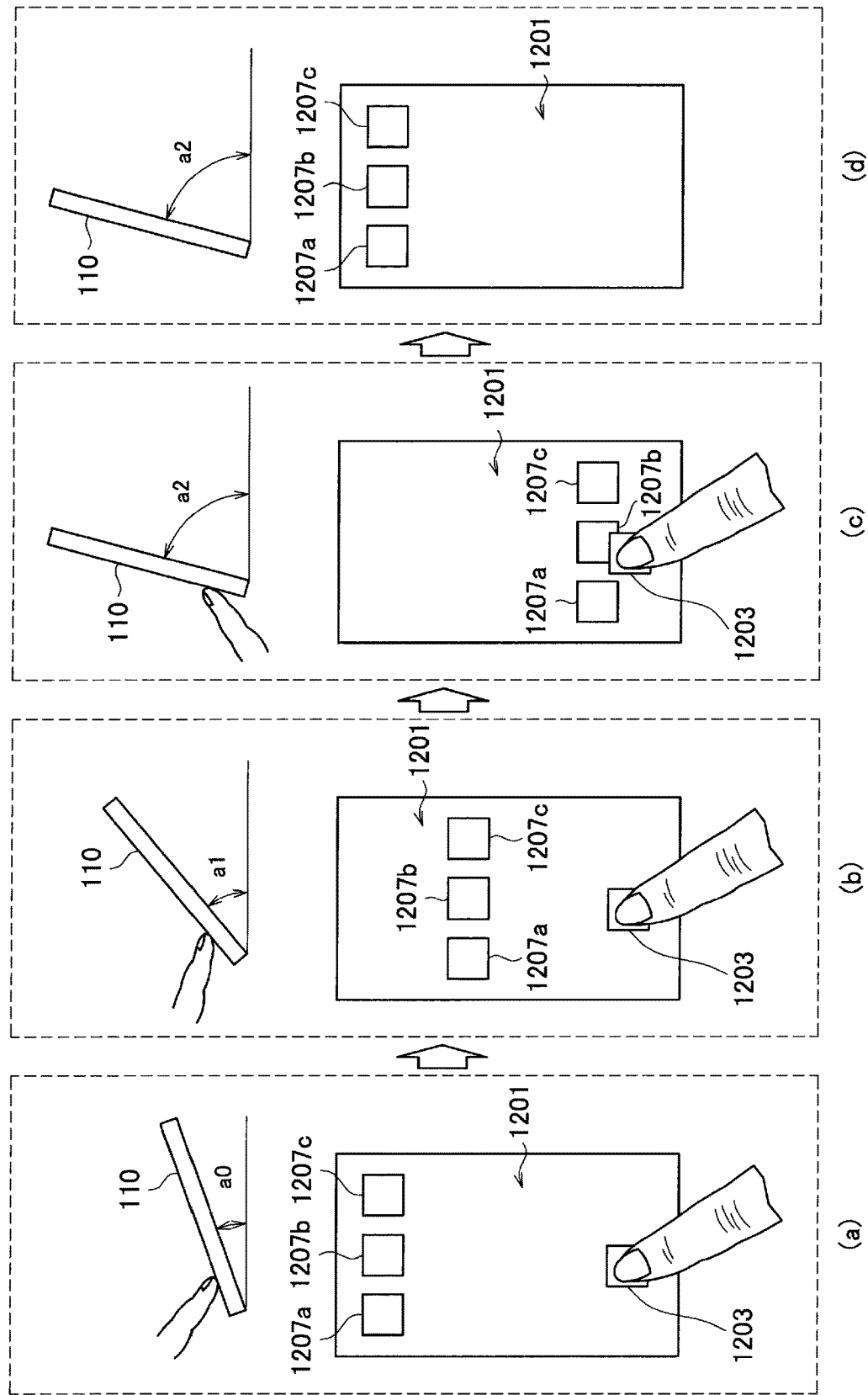
[Fig. 4]

[Fig. 5]
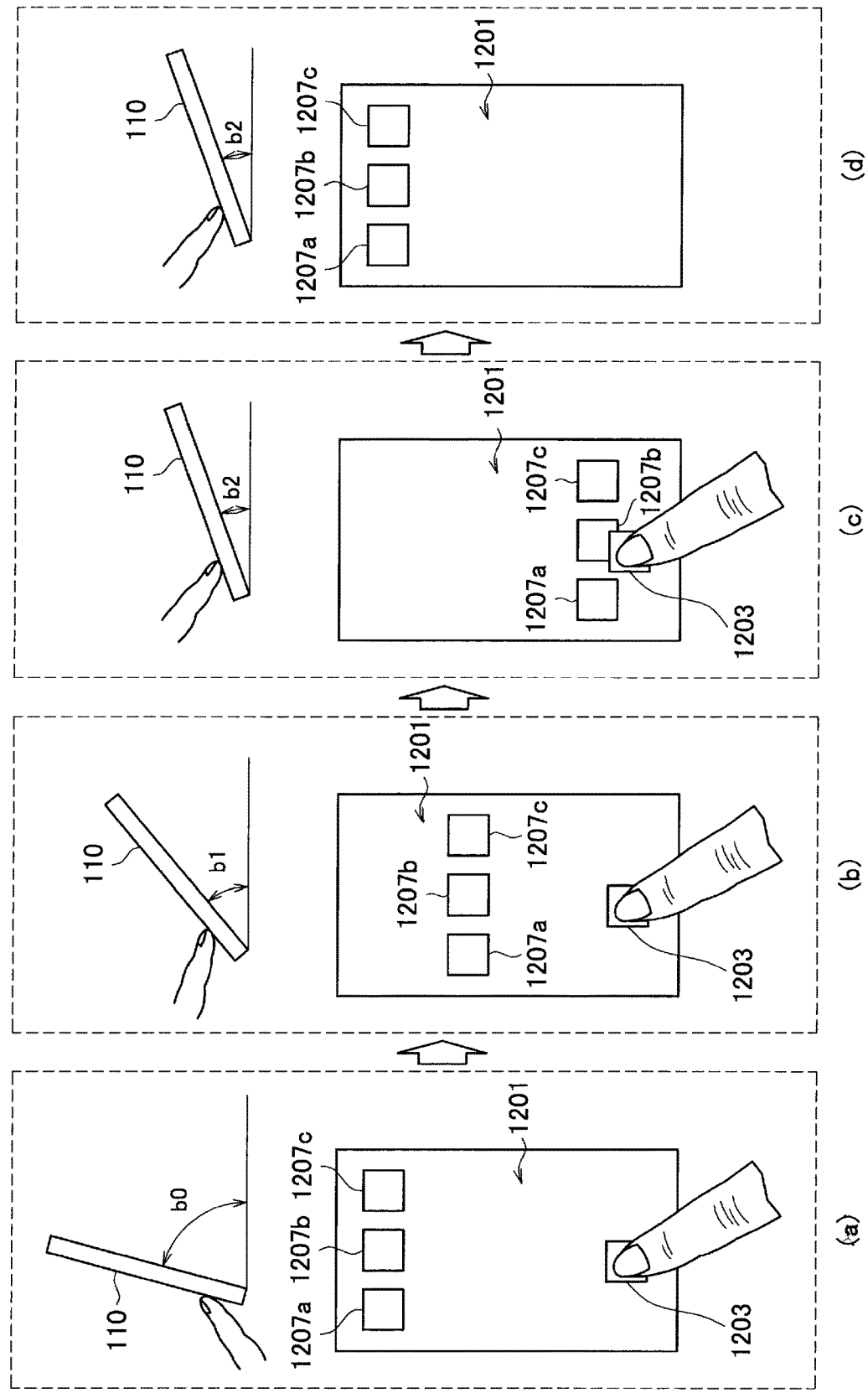

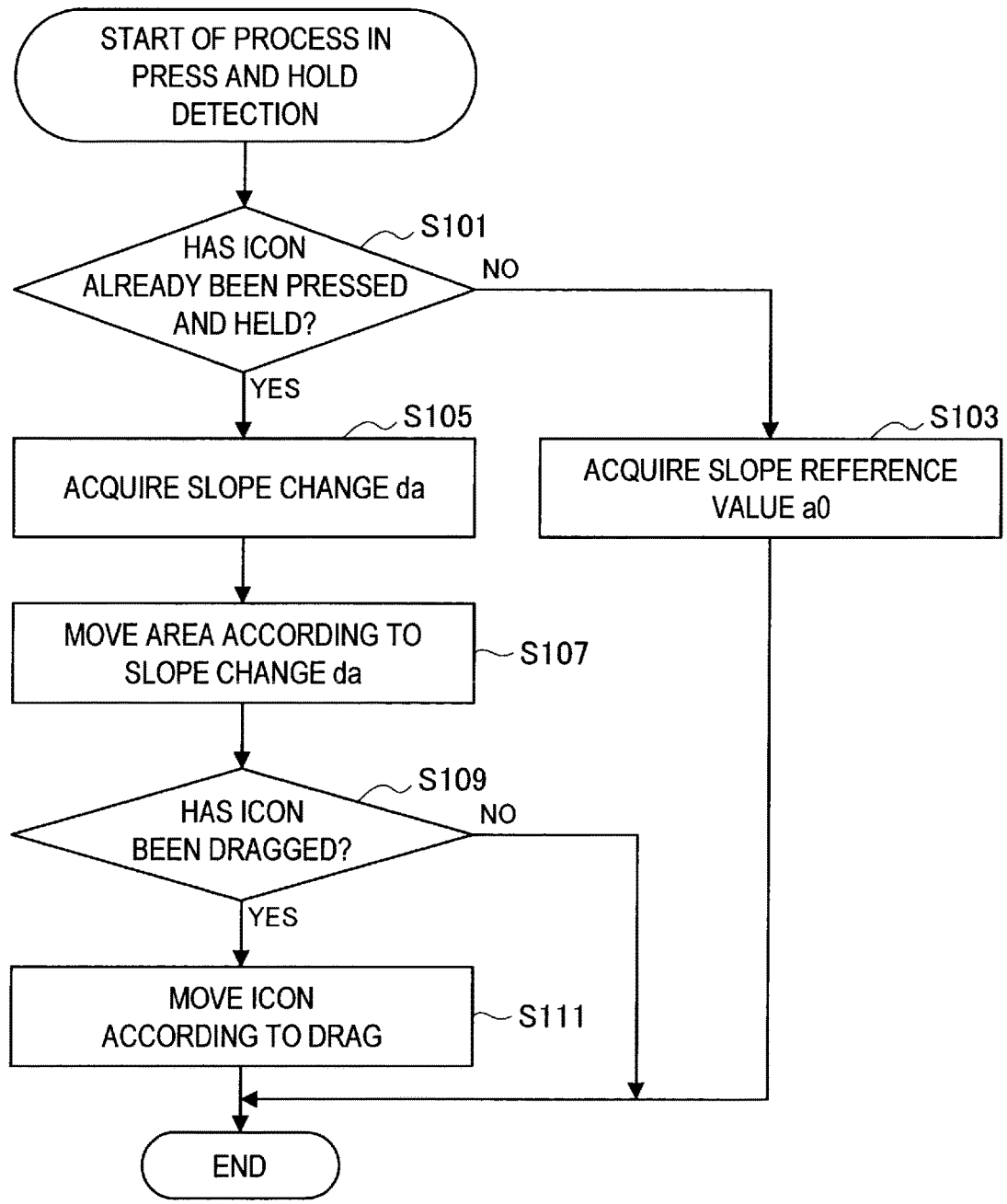
[Fig. 6]

[Fig. 7]
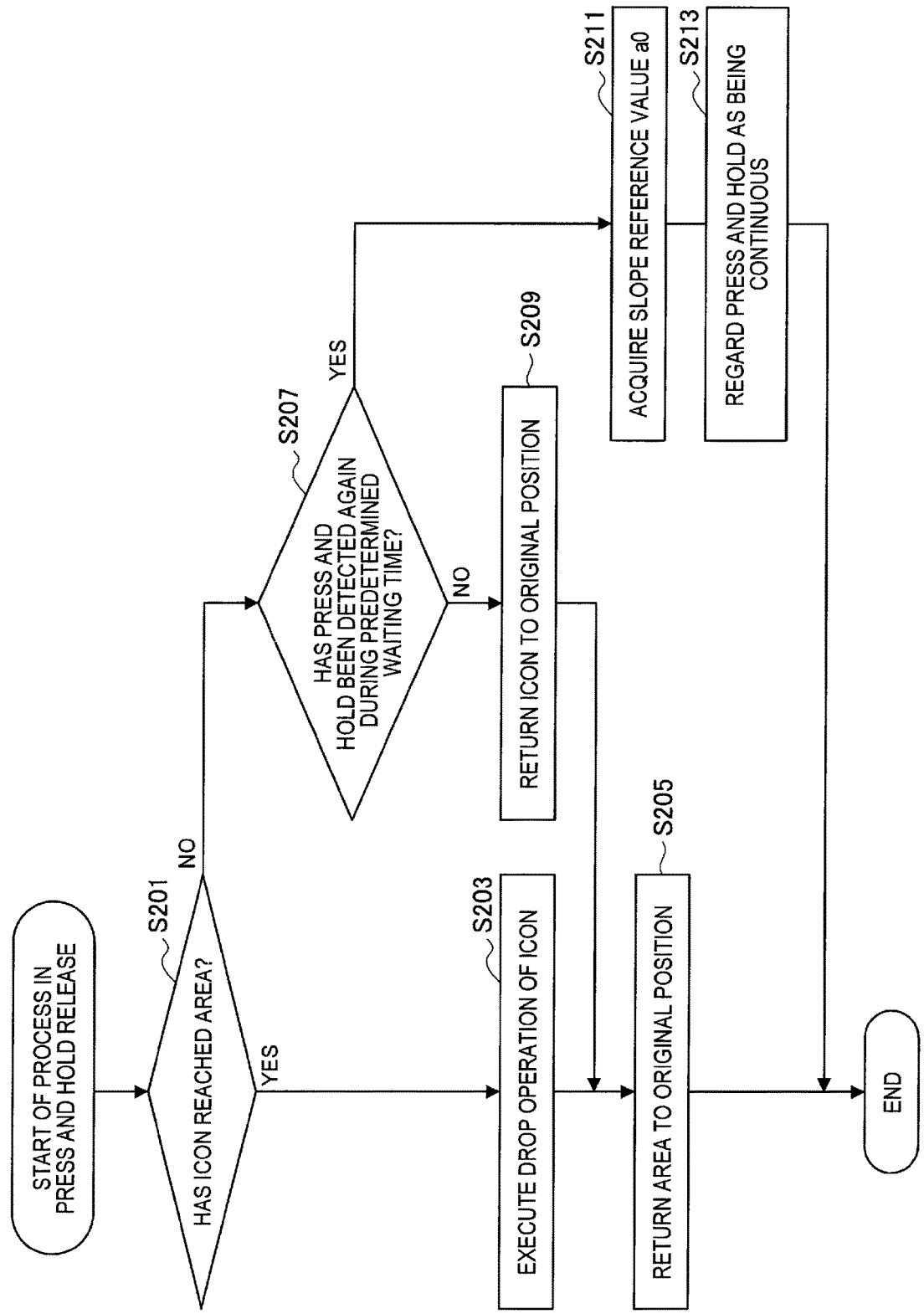

[Fig. 8]
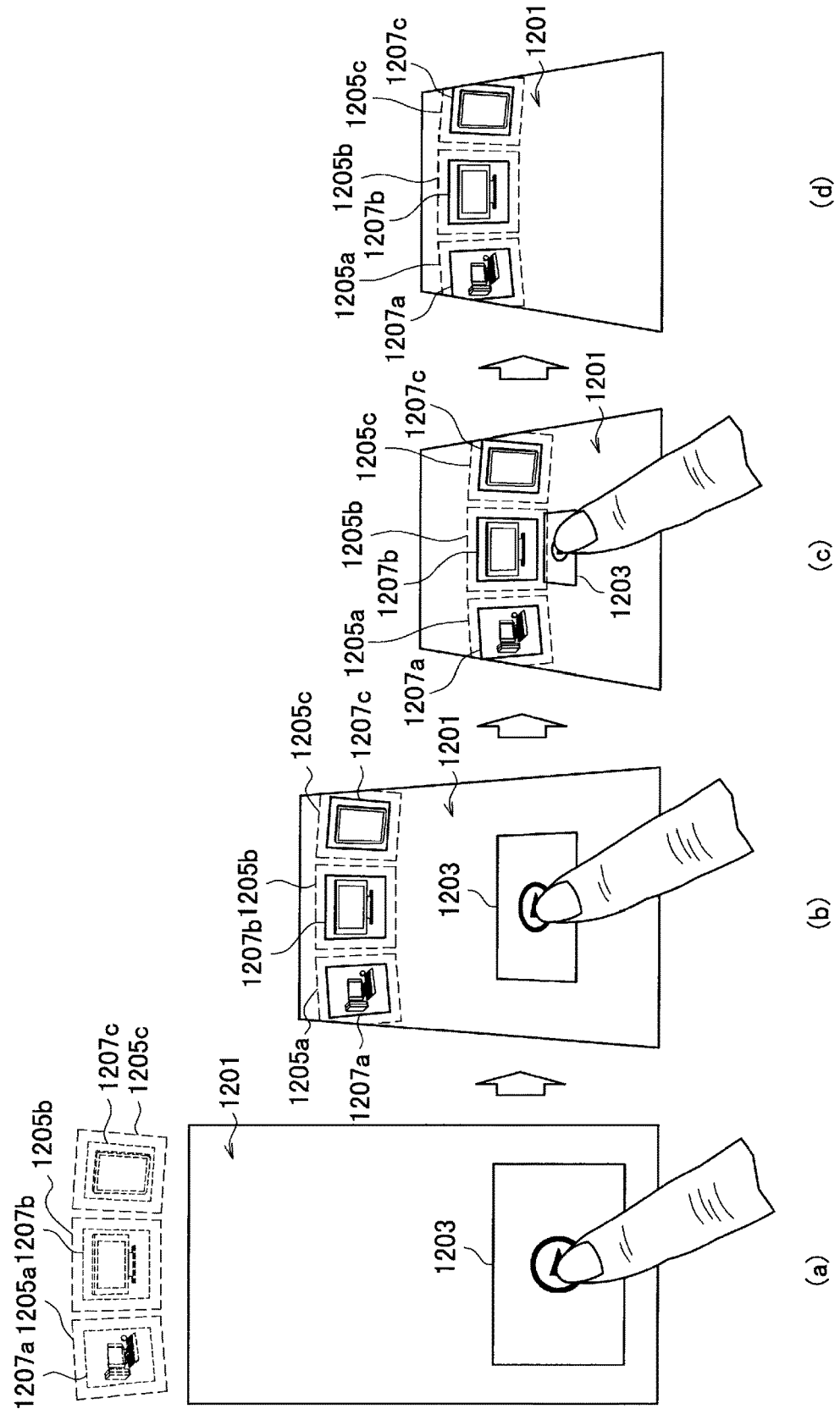

[Fig. 9]
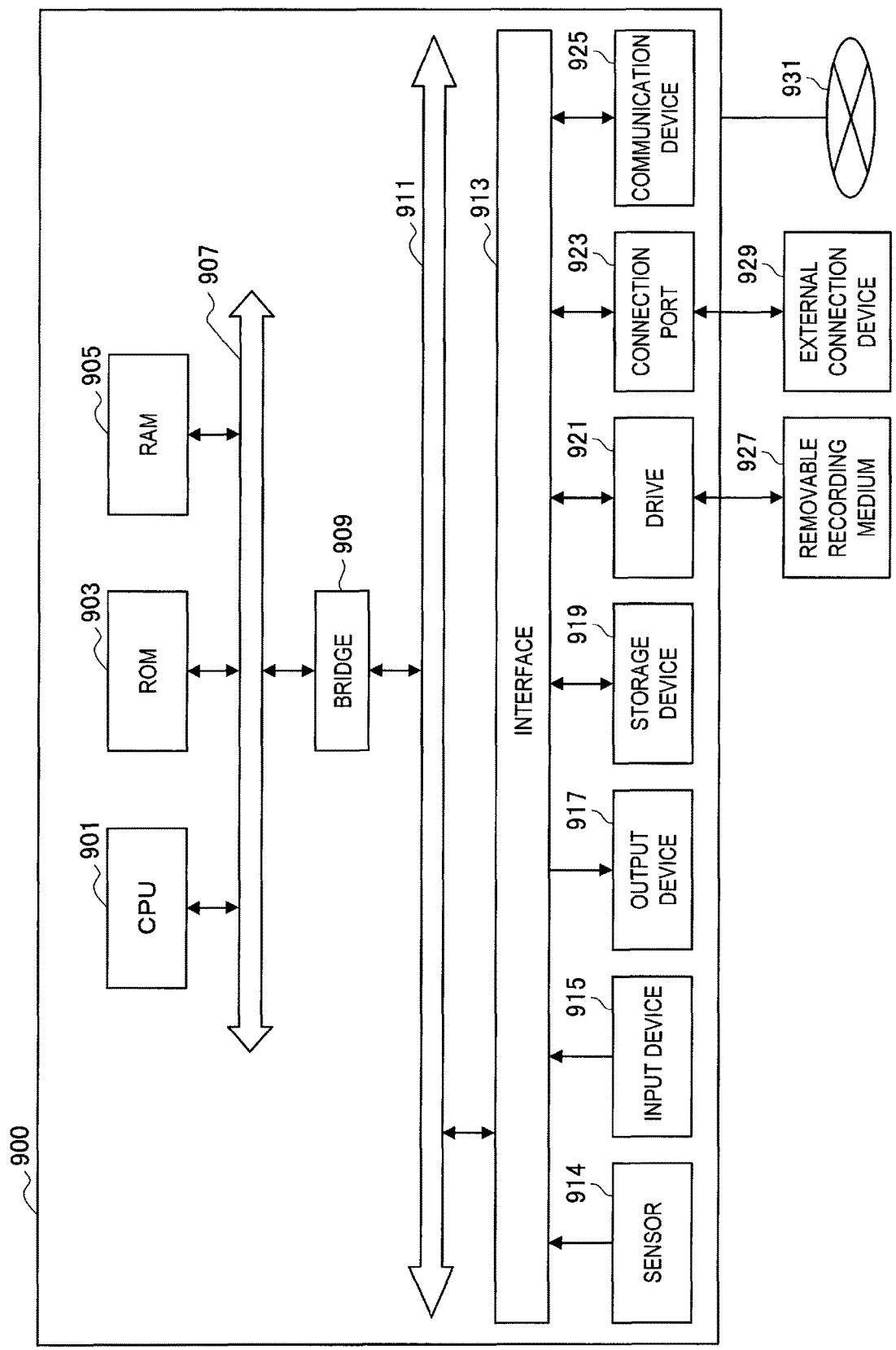

INFORMATION PROCESSING DEVICE, INFORMATION PROCESSING METHOD AND PROGRAM THAT CONTROLS MOVEMENT OF A DISPLAYED ICON BASED ON SENSOR INFORMATION AND USER INPUT

TECHNICAL FIELD

The present disclosure relates to an information processing device, an information processing method, and a program, and more specifically, to an information processing device, an information processing method, and a program that acquire a manipulation with respect to an icon displayed on a display.

BACKGROUND ART

A graphical user interface (GUI) has been a mainstream user interface of an information processing device. In the GUI, icons indicating various manipulation elements are displayed on a display, and a user manipulates the icons using a pointing device, such as a mouse or a touch panel, to execute a manipulation input to the information processing device.

With the recent spread of portable information processing devices such as smartphones and tablet PCs (Personal Computers), a user demand for GUIs has changed and new technology corresponding to such a demand has been proposed. For example, technology for moving an icon on a display according a state of user contact with a housing, a slope of the housing, or the like and arranging the icon in a position in which it is easy for the user to perform a manipulation has been proposed in Patent Literature 1.

CITATION LIST

Patent Literature

PTL 1: JP 2011-141825A

SUMMARY

Technical Problem

However, when a touch panel is used, a manipulation of an icon by a user in a GUI has a variety of examples, such as tap, double-tap, press and hold, drag, flick, etc. Accordingly, with the perspective of optimization of a GUI process for the respective types of manipulations, there is still room for enhancement to improve GUI operability even in the technology proposed in the above Patent Literature 1.

In the present disclosure, an information processing device, an information processing method, and a program that are novel and enhanced and are capable of improving operability when a manipulation causing an icon on a display to interact with a predetermined area is performed in view of the aforementioned circumstances are proposed.

Solution to Problem

An information processing apparatus including a processor that receives an output from a user interface indicating that a first icon is selected; acquires sensor information corresponding to movement of the information processing apparatus; and controls a display to move at least a second icon on the display based on the acquired sensor information corresponding to the movement of the information processing apparatus upon receiving the output from the user interface that the first icon is selected.

The sensor information corresponding to the movement of the information processing apparatus may correspond to a change in tilt or slope of the information processing apparatus, and the processor may control the display to move the second icon on the display based on the change in tilt or slope of the information processing apparatus.

A method performed by an information processing apparatus, the method comprising: receiving an output from a user interface indicating that a first icon is selected; acquiring sensor information corresponding to movement of the information processing apparatus; and controlling a display to move at least a second icon on the display based on the acquired sensor information corresponding to the movement of the information processing apparatus upon receiving the output from the user interface that the first icon is selected.

A non-transitory computer-readable medium including computer-program instructions, which when executed by an information processing apparatus, cause the information processing apparatus to perform a process comprising: receiving an output from a user interface indicating that a first icon is selected; acquiring sensor information corresponding to movement of the information processing apparatus; and controlling a display to move at least a second icon on the display based on the acquired sensor information corresponding to the movement of the information processing apparatus upon receiving the output from the user interface that the first icon is selected.

Advantageous Effects of Invention

As described above, according to the present disclosure, it is possible to improve operability when a manipulation causing the icon on the display to interact with a predetermined area is performed.

BRIEF DESCRIPTION OF DRAWINGS

FIG. 1 is a diagram showing an appearance of an information processing device according to a first embodiment of the present disclosure.

FIG. 2 is a block diagram showing a functional configuration of the information processing device according to the first embodiment of the present disclosure.

FIG. 3 is a diagram showing a display example in the first embodiment of the present disclosure.

FIG. 4 is a diagram showing a first example of a display change in the first embodiment of the present disclosure.

FIG. 5 is a diagram showing a second example of the display change in the first embodiment of the present disclosure.

FIG. 6 is a flowchart showing a process in press and hold detection in the first embodiment of the present disclosure.

FIG. 7 is a flowchart showing a process in press and hold release in the first embodiment of the present disclosure.

FIG. 8 is a diagram showing an example of a display change in a second embodiment of the present disclosure.

FIG. 9 is a block diagram illustrating a hardware configuration of the information processing device according to an embodiment of the present disclosure.

DESCRIPTION OF EMBODIMENTS

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Further, a description will be given in the following order.
1. First Embodiment
1-1. Device Configuration
1-2. Display Example
1-3. Process Flow
1-4. Summary
2. Second Embodiment
2-1. Display Example
2-2. Summary
3. Supplement

1. First Embodiment

A first embodiment of the present disclosure will be described with reference to FIGS. 1 to 7.

(1-1. Device Configuration)

First, a configuration of a device in a first embodiment of the present disclosure will be described with reference to FIGS. 1 and 2. FIG. 1 is a diagram showing an appearance of an information processing device according to the first embodiment of the present disclosure. FIG. 2 is a block diagram showing a functional configuration of the information processing device according to the first embodiment of the present disclosure.

(Appearance)

Referring to FIG. 1, the information processing device 100 according to the first embodiment of the present disclosure is a smartphone. The information processing device 100 may be, for example, a tablet PC, a PDA (Personal Digital Assistant), or any media player, as well as the smartphone.

The information processing device 100 includes a housing 110, and a display 120 is provided in the housing 110. A screen 1201 is displayed on the display 120. A first icon 1203 is displayed on the screen 1201. Further, a first area 1205 is set in the screen 1201. A second icon 1207 may be displayed in the whole or a part of the first area 1205. A touch panel 130 is provided on the display 120. The touch panel 130 acquires a user contact manipulation with respect to the display 120.

Here, the first area 1205 set in the screen 1201 is not displayed on the display 120. However, as the second icon 1207 is displayed in the whole or the part of the first area 1205 as described above, the user may recognize a position of the first area 1205. The first area 1205 may be, for example, an area interacting with the first icon 1203 when the user causes the first icon 1203 to reach the first area 1205 through a contact manipulation with respect to the display 120.

Further, the interaction between the first icon 1203 and the first area 1205 refers to, for example, any process executed by a manipulation element (e.g. a file) shown by the first icon 1203 and a manipulation element (e.g. a folder) shown by the first area 1205 (e.g. movement of the file to the folder), such as a drag and drop manipulation.

As the second icon 1207 is displayed in the whole or the part of the first area 1205 as described above, the user can recognize the position of the first area 1205, as described above. Further, when the second icon 1207 is an icon indicating a manipulation element shown by the first area 1205, the manipulation element, i.e., content of an interaction occurring when the first icon 1203 is caused to reach the first area 1205, can be caused to be recognized by the user.

Further, if the second icon 1207 is displayed in the whole of the first area 1205 when the second icon 1207 is displayed in the first area 1205, the above interaction occurs only when the first icon 1203 and the second icon 1207 are superimposed. This corresponds to a so-called drag and drop manipulation. On the other hand, when the second icon 1207 is displayed in the part of the first area 1205, the above interaction occurs in a case in which the first icon 1203 and the second icon 1207 are superimposed, as well as in a case in which the first icon 1203 reaches a predetermined range (i.e., the first area 1205) near the second icon 1207. This corresponds to a so-called drag and throw manipulation.

(Functional Configuration)

Referring to FIG. 2, the information processing device 100 includes, as a functional configuration, a display 120, a touch panel 130, a display control unit 140, a position setting unit 150, a control unit 160, a slope reference value acquisition unit 170, a slope detection unit 180, and a slope change acquisition unit 190.

The display 120 is a display provided in the housing 110, as described above. The display 120 is controlled by, for example, the LCD (Liquid Crystal Display) display control unit 140 to display the screen 1201.

The touch panel 130 is a manipulation acquisition unit that is provided on the display 120 and acquires a user contact manipulation with respect to the display 120, as described above. The touch panel 130 is, for example, a touch panel using any scheme such as a resistive film scheme or a capacitive scheme, and detects a contact manipulation of a manipulation body such as a finger of a user or a stylus. The touch panel 130 outputs the detection result to the control unit 160. A manipulation acquired by the touch panel 130 includes a predetermined user manipulation that causes the first icon 1203 and the first area 1205 to interact with each other, as will be described later.

The display control unit 140 is realized, for example, by a CPU (Central Processing Unit), a RAM (Random Access Memory), a ROM (Read Only Memory) and the like to control the display 120. The display control unit 140 causes the display 120 to display the screen 1201. The display control unit 140 uses positions set by the position setting unit 150 as positions of the first icon 1203 and the first area 1205 on the screen 1201.

The position setting unit 150 is realized by, for example, a CPU, a RAM, a ROM and the like to set the positions on the screen 1201 of the first icon 1203 and the first area 1205. When a predetermined user manipulation is acquired by the touch panel 130, the position setting unit 150 is controlled by the control unit 160 to move the position of the first area 1205 toward the first icon 1203 according to a slope change of the housing 110 acquired by the slope change acquisition unit 190. Here, there are various variations in the movement of the first area 1205 according to the slope change of the housing 110. For example, the slope change of the housing 110 and a movement distance of the first area 1205 may be in proportion to each other. Further, for example, a gain may be set so that a movement distance of the first area 1205 per angle increases as an angle of the slope change of the housing 110 increases.

The control unit 160 is realized by, for example, a CPU, a RAM, a ROM and the like to control the respective units of the information processing device 100. The control unit 160 controls, for example, the position setting unit 150 and the slope reference value acquisition unit 170 according to a user contact manipulation acquired by the touch panel 130.

More specifically, when a predetermined user manipulation begins to be acquired by the touch panel 130, the control unit 160 controls the position setting unit 150 to move the position of the first area 1205 according to the slope change of the housing 110 or controls the slope reference value acquisition unit 170 to acquire the slope reference value. On the other hand, when a predetermined user manipulation is not acquired by the touch panel 130, the control unit 160 may control the position setting unit 150 to end the movement of the first area 1205.

The slope reference value acquisition unit 170 is realized by, for example, a CPU, a RAM, a ROM and the like to acquire a slope of the housing 110 at a certain time, as a slope reference value, based on the output of the slope detection unit 180. For example, when a predetermined user manipulation begins to be acquired by the touch panel 130, the slope reference value acquisition unit 170 acquires the slope reference value under control of the control unit 160.

The slope detection unit 180 is, for example, a motion sensor such as an angular velocity sensor, an acceleration sensor, or an angle sensor, and detects the slope of the housing 110. The slope detection unit 180 outputs the detection result to the slope reference value acquisition unit 170 and the slope change acquisition unit 190.

The slope change acquisition unit 190 is realized by, for example, a CPU, a RAM, a ROM and the like, and acquires a change of the slope of the housing 110 at a current time from the slope reference value as a slope change based on the output of the slope detection unit 180. As described above, for example, when a predetermined user manipulation begins to be acquired by the touch panel 130, the slope reference value is acquired by the slope reference value acquisition unit 170. The slope change acquisition unit 190 outputs the acquired slope change to the position setting unit 150.

(1-2. Display Example)

Next, a display example in the first embodiment of the present disclosure will be described with reference to FIGS. 3 to 5. FIG. 3 is a diagram showing a display example in the first embodiment of the present disclosure. FIG. 4 is a diagram showing a first example of a display change in the first embodiment of the present disclosure. FIG. 5 is a diagram showing a second example of the display change in the first embodiment of the present disclosure.

In FIG. 3, an example in which a first icon 1203, a plurality of first areas 1205a to 1205c, and second icons 1207a to 1207c displayed in the respective first areas are displayed on the screen 1201 is shown. In the shown example, the second icon 1207 is displayed in substantially the whole of the first area 1205, but may be displayed only in a part of the first area 1205 as in the example of FIG. 1 or may not be displayed. Here, a position p1 of the first icon 1203 and positions p2a to p2c of the first areas 1205a to 1205c are all set by the position setting unit 150.

First Example

A first example of a display change of the screen 1201 when a manipulation causing the first icon 1203 to interact with the first area 1205 is performed by a user in the display example of FIG. 3 is shown in FIG. 4. Further, the first area 1205 and the positions p1 and p2 are not shown in FIGS. 4 and 5 for simplicity, but the first area 1205 may be set in an area substantially coincident with the second icon 1207 and the position p1 of the first icon 1203 and the position p2 of the first area 1205 may be set by a position setting unit 150, similarly to FIG. 3.

Here, in the present embodiment, a press and hold manipulation in which a user continuously contacts the first icon 1203 via the touch panel 130 is assumed to be a predetermined user manipulation causing the first icon 1203 to interact with the first area 1205. Further, since moving a contact position while performing the press and hold manipulation is a drag manipulation, there is a case in which the drag manipulation is included in the press and hold manipulation in the following description.

First, in a state (a), the display of the screen 1201 is the same as that shown in FIG. 3. In this state, the user starts the press and hold manipulation with respect to the first icon 1203. For example, when the touch panel 130 detects a contact manipulation that continues a predetermined time or more with respect to the first icon 1203 displayed on the display 120, the control unit 160 determines that a predetermined user manipulation has started. The predetermined user manipulation is described above as being a press and hold manipulation, but is not limited to this configuration. For example, the predetermined user manipulation may correspond to a dragging operation performed with respect to the first icon 1203. When the touch panel 130 detects a drag manipulation with respect to the first icon 1203 displayed on the display 120, the control unit 160 determines that a predetermined user manipulation has started.

In this case, the control unit 160 controls the slope reference value acquisition unit 170 to acquire a slope a0 of the housing 110 at this time as a slope reference value. Further, the control unit 160 controls the position setting unit 150 to move the position p2 of the first area 1205 according to a slope change acquired by the slope change acquisition unit 190.

Further, in the shown example, the slope of the housing 110 is shown as an x axis rotation angle of a coordinate axis shown in FIG. 1 relative to a state in which the housing 110 is held horizontally. A real slope of the housing 110 contains a rotation angle component of an axis different from the x axis. In this case, the slope detection unit 180 may provide, for example, an extracted x axis rotation angle component, as the slope of the housing 110, to the slope reference value acquisition unit 170 and the slope change acquisition unit 190. Accordingly, a change of an x axis rotation angle corresponding to a direction connecting the first icon 1203 with the first area 1205 can correspond to the movement of the first area 1205, and the user can be caused to easily recognize a relationship between the change in the slope of the housing 110 and the movement of the first area 1205.

Next, in a state (b), for example, as the user raises the housing 110, a slope a1 of the housing 110 is larger than the slope a0 in the state (a). In this case, the slope change acquisition unit 190 acquires the slope change da, for example, as da=|a1−a0|. The position setting unit 150 moves the first areas 1205a to 1205c (in which the second icons 1207a to 1207c are displayed in FIG. 4) toward the first icon 1203 according to the slope change da.

Here, for example, it is assumed that the change in the slope of the housing 110 has stopped while the first icon 1203 is being pressed and held by the user in the state (b). In this case, since the slope change da is not changed, the position setting unit 150 no longer moves the first areas 1205a to 1205c. Thus, in the present embodiment, the positions of the first areas 1205a to 1205c are continuously moved using occurrence of the slope change da as a trigger, but are moved a distance according to the slope change da from the displayed position in the state (a). Accordingly, the user can move the first area 1205 according to an intentional operation to tilt the housing 110, thereby preventing, for example, an incorrect manipulation. The present embodiment, however, is not limited to this configuration. For example, upon detecting that the slope change da is not detected, the position setting unit 150 may continue to move the first areas 1205a to 1205c in an inertial manner at a continuous speed. This would allow a user to tilt the housing 110 thus triggering continuous movement of the first areas 1205a to 1205c.

Next, in a state (c), for example, as the user further raises the housing 110, a slope a2 of the housing 110 is larger than the slope a1 in the state (b). The slope change acquisition unit 190 acquires the slope change da, for example, as da=|a2−a0|, as in the case of (b). The position setting unit 150 moves the first areas 1205a to 1205c (in which the second icons 1207a to 1207c are displayed in FIG. 4) toward the first icon 1203 according to the slope change da. da in the state (c) may be greater than da in the state (b). Accordingly, the position setting unit 150 further moves the first area 1205 toward the first icon 1203 from the state (b) to the state (c).

In the state (c), as the first area 1205 is moved toward the first icon 1203, the second icon 1207b is superimposed on the first icon 1203. That is, the first icon 1203 reaches the first area 1205b. In this state, when the user releases the press and hold manipulation with respect to the first icon 1203, interaction between the first icon 1203 and the first area 1205b occurs. In the shown example, a file shown by the first icon 1203 is moved to a folder shown by the first area 1205b through the interaction. In the present embodiment, in this case, the first icon 1203 disappears from the screen 1201.

Next, in a state (d), as the press and hold manipulation of the user with respect to the first icon 1203 is released in the state (c) as described above, the interaction between the first icon 1203 and the first area 1205b occurs, and the icon 1203 disappears from the screen 1201. A slope a2 of the housing 110 is not changed from the state (c). Here, the position setting unit 150 may return the first area 1205 to the position displayed in the state (a) irrespective of the slope of the housing 110, as shown.

According to the change in the display of the screen 1201 as shown in (a) to (d), as the first area 1205 is moved toward the first icon 1203 according to the change in the slope of the housing 110, the user can move the first area 1205 toward the first icon 1203 and execute a manipulation through the interaction between the first icon 1203 and the first area 1205 by tilting the housing 110 even when the user does not move while pressing and holding the first icon 1203.

Such a configuration is effective, for example, when the user tries to grasp and manipulate the information processing device 100 with one hand. In this case, the user, for example, grasps the housing 110 in four fingers and the palm and performs a contact manipulation with respect to the display 120 with the remaining finger. Accordingly, for example, when a general drag and drop manipulation is performed between the first icon 1203 and the first area 1205, the finger may reach the first icon 1203, but does not reach the first area 1205. As a result, there are many cases in which the user should use both hands for the manipulation.

On the other hand, in the present embodiment, since the first area 1205 is moved toward the first icon 1203, the user can cause the first icon 1203 to reach the first area 1205 without using both hands. It is understood that the user may move the first icon 1203 using a drag manipulation to move the contact position while performing the press and hold manipulation. Even in this case, a moving distance of the first icon 1203 by the above configuration may be smaller than that by a general drag and drop manipulation.

As another configuration for obtaining the same effect, for example, moving an icon on the screen to be glided in a direction of the slope when the housing is tilted a predetermined angle or more irrespective of whether a predetermined user manipulation has been performed is also considered. However, in this case, for example, the icon is freely moved due to a slope of the housing not intended by the user, which is likely to cause an incorrect manipulation. Further, particularly, even when the user does not desire to move the icon, the user often tilts and grasps the housing. Accordingly, in the above other configuration, it is difficult to move the icon by an appropriate movement amount when the user desires to move the icon.

In the present embodiment, the first area 1205 is moved only when a predetermined user manipulation is being performed with respect to the touch panel 130 or moved according to a change in a slope of the housing 110 from the slope when the user manipulation starts. Accordingly, since the first area 1205 is not moved when the predetermined user manipulation is not being performed, an incorrect manipulation due to an unintended movement of the area is prevented. Further, since the slope of the housing 110 at a time when the predetermined user manipulation starts, that is, at a time that the user recognizes as a reference, becomes a reference of the movement of the first area 1205, a manipulation to tilt the housing 110 and move the first area 1205 becomes more intuitive.

Second Example

In FIG. 5, an example in which the slope of the housing 110 is changed in a reverse direction from the example of FIG. 4 is shown. That is, the slope of the housing 110 gradually decreases from a slope b0 in a state (a) to a slope b1 in a state (b) and a slope b2 in a state (c). In this case, for example, when the slope change acquisition unit 190 acquires a slope change db as db=|b1−b0| or db=|b2−b0|, as in the example of FIG. 4, the slope change db in (b) is greater than that in (a) and the slope change db in (c) is greater than that in (b). Accordingly, as shown in FIG. 5, the first areas 1205a to 1205c (in which the second icons 1207a to 1207c are displayed in FIG. 5) on the screen 1201 are moved toward the first icon 1203, as in the example of FIG. 4. In (d), the position setting unit 150 may return the first area 1205 to the position displayed in the state (a), as in the example of FIG. 4.

Thus, even when the slope of the housing 110 gradually decreases when the user brings the housing 110 back down, the information processing device 100 may move the first area 1205 toward the first icon 1203 according to a change in the slope. Accordingly, among the operation for raising the housing 110 and the operation for bringing the housing 110 back down, the user performs the operation that it is easy to perform at a time when the press and hold manipulation with respect to the first icon 1203 starts, and moves the first area 1205 toward the first icon 1203. Thus, it is possible to easily perform a manipulation through the interaction between the first icon 1203 and the first area 1205.

Further, in the above example, the first area 1205 is moved toward the first icon 1203 when the housing 110 is forward or when the housing 110 is brought back down, but the user may select one of the two operations. In this case, the slope change acquisition unit 190, for example, may regard a change in the slope of the housing 110 in a nonselected direction as 0. Accordingly, the user, for example, may selectively assign a slope in a sensorily fitting direction to the movement of the first area 1205.

(1-3. Process Flow)

Next, an example of a process flow in the first embodiment of the present disclosure will be described with reference to FIGS. 6 and 7. FIG. 6 is a flowchart showing a process in press and hold detection in the first embodiment of the present disclosure. FIG. 7 is a flowchart showing a process in press and hold release in the first embodiment of the present disclosure.

(Process in Press and Hold Detection)

First, a process in press and hold detection will be described with reference to FIG. 6. The process in press and hold detection is started by the control unit 160, for example, when the touch panel 130 continuously detects the user contact manipulation with respect to the first icon 1203 for a predetermined period of time or more First, the control unit 160 determines whether the first icon 1203 has already been pressed and held (step S101). Here, when the first icon 1203 has not yet been pressed and held, the control unit 160 determines that the press and hold manipulation of the first icon 1203 has newly started. In this case, the slope reference value acquisition unit 170 acquires the slope of the housing 110 at this time as the slope reference value a0 from the detection result of the slope detection unit 180 under control of the control unit 160 (step S103).

On the other hand, when the first icon 1203 has already been pressed and held in step S101, the control unit 160 determines that a process of moving the first area 1205 has already started. In this case, the slope change acquisition unit 190 acquires a difference between the slope of the housing 110 at this time and the already acquired slope reference value a0 from the detection result of the slope detection unit 180, as the slope change da (step S105). Next, the position setting unit 150 moves the first area 1205 set in the screen 1201 according to the acquired slope change da (step S107).

Here, the control unit 160 may determine whether the first icon 1203 has been dragged (step S109). As described above, the drag manipulation is acquired as the user moves the contact position in a state in which the first icon 1203 is pressed and held. When the drag manipulation is acquired, the control unit 160 provides information of contact position movement to the position setting unit 150, and the position setting unit 150 moves the position of the first icon 1203 according to the drag manipulation (step S111). Then, the process in the press and hold detection ends.

(Process in Press and Hold Release)

Next, a process in press and hold release will be described with reference to FIG. 7. The process in press and hold release, for example, is started by the control unit 160 when the touch panel 130 does not detect a user contact manipulation in a state in which the first icon 1203 has been pressed and held.

First, the control unit 160 acquires information from the position setting unit 150 and determines whether the first icon 1203 reaches the first area 1205 (step S201). Here, if the first icon 1203 reaches the first area 1205, the control unit 160 executes a drop operation to drop the first icon 1203 to the first area 1205 (step S203).

Further, on the display 120, when the first icon 1203 is superimposed on the second icon 1207 displayed in the first area 1205, the first icon 1203 is displayed to be dropped to the second icon 1207. Further, when the first icon 1203 reaches the first area 1205 but is not superimposed on the second icon 1207, the first icon 1203 is displayed as being thrown toward the second icon 1207.

When the drop operation is executed in step S203, the position setting unit 150 may return the first area 1205 to an original position before the press and hold manipulation with respect to the first icon 1203 started (step S205). In any case, when the press and hold manipulation of the first icon 1203 by the user ends, the movement of the first area 1205 ends.

On the other hand, when the first icon 1203 does not reach the first area 1205 in step S201, the control unit 160 waits a predetermined time and determines whether the press and hold of the first icon 1203 is detected again while waiting (step S207). Here, when the press and hold is not detected, the position setting unit 150 returns the first icon 1203 to an original position before the press and hold manipulation starts (step S209). Further, as another example, the control unit 160 may execute step S209 immediately after step S201 without waiting a predetermined time. Further, the position setting unit 150 may return the first area 1205 to an original position before the press and hold manipulation for the first icon 1203 started (step S205).

On the other hand, if the press and hold manipulation is detected again during a predetermined waiting time in step S207, the control unit 160 resumes the process in the press and hold of the first icon 1203. Here, additionally, the slope reference value acquisition unit 170 may acquire the slope of the housing 110 at this time as the slope reference value a0 from the detection result of the slope detection unit 180 (step S211). Then, the control unit 160 regards the press and hold manipulation with respect to the first icon 1203 as being continuous and resumes the process (step S213).

When the above step S211 is executed, the slope reference value acquisition unit 170 acquires the slope reference value a0 again when the press and hold manipulation is resumed. For example, when the slope of the housing 110 is changed during a waiting time in step S207, the slope of the housing 110 after the change is set as the slope reference value a0. Accordingly, for example, when the user stops the press and hold manipulation due to a posture change, the slope reference value a0 suitable for the change posture of the user can be newly set. Further, for example, as the user raises the housing 110 or brings the housing 110 back down in a sense of the user rowing a bot, the first icon 1203 can be caused to reach the first area 1205 with a smaller slope change. More specifically, in the case of the example of FIG. 4, the user first raises the housing 110 while performing the press and hold manipulation with respect to the first icon 1203 from the state (a). The user then stops the press and hold manipulation at the time of (b) in which the first area 1205 approaches the first icon 1203 to a certain extent, and reversely brings the housing 110 back down. For example, the user returns the slope of the housing 110 from the slope a1 of the state (b) to the slope a0 of the state (a). When the user resumes the press and hold manipulation during the waiting time in the above step S207, the position of the first area 1205 becomes the state (b) and the slope of the housing 110 becomes the state (a). The user then continues to raise the housing 110, like before, so that the first icon 1203 can reach the first area 1205, but the slope of the housing 110 at this time may be smaller than the slope a2 of the state (c). Such a configuration is effective, for example, when the user does not desire to greatly change the slope of the housing 110.

(1-4. Summary)

The first embodiment of the present disclosure has been described above. In the present embodiment, when the user tilts the housing while performing a manipulation for causing an interaction between the first icon displayed on the screen and the first area, the information processing device moves the first area toward the first icon. Accordingly, for example, when the user tries to cause the first icon to reach the first area through the drag manipulation, a drag distance of the first icon is short. Further, the user may not drag the first icon or may perform only the press and hold manipulation. Even in this case, as the first area is moved toward the first icon, the first icon is caused to reach the first area, thus causing the interaction between the first icon and the first area. With such a configuration, for example, it is possible to greatly improve operability when the user manipulates the information processing device with one hand.

Furthermore, in the present embodiment, unlike a case in which the slope of the housing is simply used as a trigger for the icon movement, the slope of the housing when a predetermined user manipulation (e.g. press and hold, or drag) is acquired by the touch panel is acquired as the reference value, and the first area is moved according to the change of the slope from the reference value as long as the predetermined user manipulation continues. Accordingly, it is possible to prevent an incorrect manipulation or a malfunction while improving operability for a user.

2. Second Embodiment

Next, a second embodiment of the present disclosure will be described with reference to FIG. 8. Further, since the second embodiment of the present disclosure has the same configuration as the first embodiment described above except for parts that will be described hereinafter, a detailed description of such parts will be omitted.

(2-1. Display Example)

A display example in the second embodiment of the present disclosure will be described with reference to FIG. 8. FIG. 8 is a diagram showing an example of a display change in the second embodiment of the present disclosure.

First, in an initial state (a), a first icon 1203 is displayed on a screen 1201. Positions of first areas 1205a to 1205c are also set in the screen 1201, but at this time, the positions are initially set outside a displayable area of the screen 1201. Accordingly, second icons 1207a to 1207c displayed in parts of the first areas 1205a to 1205c are not displayed on the screen 1201.

Further, in the shown example, the first icon 1203 is an icon of a thumbnail image indicating moving image content. Further, the first areas 1205a to 1205c are areas indicating devices to which the moving image content shown by the first icon 1203 is to be sent. The second icons 1207a to 1207c indicate devices (a desktop type PC, a television, and a tablet PC) shown in the first areas 1205a to 1205c, respectively. The second icons 1207a to 1207c may also indicate applications capable of being executed by the information processing apparatus to access an internet-based application to which the moving image content is to be uploaded. In this regard, the description provided below is also applicable to the situation when the moving image content is to be uploaded to the internet-based application.

Further, the display area of the second icon 1207 is set to be a predetermined distance from an outer edge of the first area 1205. Conversely, an area within a predetermined distance from the display area of the second icon 1207 is set as the first area 1205.

In the state (a), the user starts a press and hold manipulation with respect to the first icon 1203 and also tilts the housing 110 (not shown) to be brought back down.

Next, in a state (b), as the user tilts the housing 110, the first area 1205 moves toward the first icon 1203, and enters the displayable area of the screen 1201. Accordingly, the second icon 1207 is displayed together with the first icon 1203 on the screen 1201. In the shown example, the user executes a manipulation to press and hold the first icon 1203 and move the first icon 1203, that is, a drag manipulation, and accordingly, the first icon 1203 displayed on the screen 1201 is also moved.

Next, in a state (c), as the user further tilts the housing 110, the first area 1205 is further moved toward the first icon 1203, and the first icon 1203 is further moved due to the drag manipulation of the user. In this state, the first icon 1203 reaches an area in which the second icon 1207 is not displayed in the first area 1205. That is, the first icon 1203 approaches within a predetermined distance from the second icon 1207.

In this state, when the user releases the press and hold manipulation with respect to the first icon 1203, an interaction between the first icon 1203 and the first area 1205b occurs. This corresponds to a so-called drag and throw manipulation. After the user drags the first icon 1203 to a position in which the first icon 1203 is superimposed on the second icon 1207b or tilts the housing 110 to move the first area 1205b, the user can release the press and hold manipulation with respect to the first icon 1203. Even in this case, similarly, an action of the first icon 1203 and the first area 1205b corresponds to a so-called drag and drop manipulation.

As described above, in the shown example, data of the content shown by the first icon 1203 is sent to the device shown by the first area 1205b through the interaction. When this manipulation is executed, the first icon 1203 may disappear from the screen 1201 or may return to the position displayed in the state (a).

Next, in a state (d), as the press and hold manipulation of the user with respect to the first icon 1203 is released in the state (c), the interaction between the first icon 1203 and the first area 1205b occurs and the icon 1203 disappears from the screen 1201. In the shown example, the position setting unit 150 returns the first area 1205 to the position displayed in the state (b). Thus, the position setting unit 150 may move the position of the first area 1205 after the interaction with the first icon 1203 to a position other than the initially set position. In the shown example, as the first area 1205 and the second icon 1207 do not return to the initially set position outside the displayable area and are continuously displayed on the screen 1201, the user, for example, can confirm a posteriori the device to which the content shown by the first icon 1203 has been sent.

(2-2. Summary)

The second embodiment of the present disclosure has been described above. In the present embodiment, any additional configurations that can also be applied to the first embodiment described above have been shown.

For example, the position of the first area may be set outside the displayable area of the screen. If the user is notified in advance of the fact that the first area (and the second icon) is being moved toward the first icon according to a manipulation to tilt the housing in a predetermined direction, the user may tilt the housing to move the first area into the screen, if necessary. In other cases, an area of the screen can be used for other displays.

Further, the first area may be set as an area within a predetermined distance from the display area of the second icon. In this case, as the user releases a drag manipulation (or a press and hold manipulation) with respect to the first icon in a position within a predetermined distance from the second icon, a so-called drag and throw manipulation can be performed. Accordingly, a manipulation causing an interaction between the first icon and the first area becomes smoother.

3. Supplement (Hardware Configuration)

Next, a hardware configuration of an information processing device 900 that can realize the information processing device according to the embodiment of the present disclosure will be described in detail with reference to FIG. 9. FIG. 9 is a block diagram illustrating a hardware configuration of the information processing device according to the embodiment of the present disclosure.

The information processing device 900 mainly includes a CPU 901, a ROM 903 and a RAM 905. Also, the information processing device 900 further includes a host bus 907, a bridge 909, an external bus 911, an interface 913, a sensor 914, an input device 915, an output device 917, a storage device 919, a drive 921, a connection port 923, and a communication device 925.

The CPU 901 functions as an arithmetic processing unit and a control unit, and controls the entire operation within the information processing device 900 or a part thereof in accordance with various programs recorded on the ROM 903, the RAM 905, the storage device 919, or the removable recording medium 927. The ROM 903 stores programs, operation parameters, and the like used by the CPU 901. The RAM 905 temporarily stores programs used by the CPU 901, parameters that change as appropriate while executing the programs, and the like. The above constituents are mutually connected by a host bus 907 constructed from an internal bus such as a CPU bus. Further, the host bus 907 is connected to the external bus 911 such as a PCI (Peripheral Component Interconnect/Interface) via the bridge 909.

Further, the host bus 907 is connected to the external bus 911 such as a PCI (Peripheral Component Interconnect/Interface) via the bridge 909.

The sensor 914 is a detection unit for detecting various pieces of information used for the process in the information processing device 900. In an embodiment of the present disclosure, for example, a motion sensor such as an angular velocity sensor, an acceleration sensor, or an angle sensor may be used as the sensor 914 to detect the slope of the housing of the information processing device 900. For example, a vibration gyro sensor, a rotational-frame gyro sensor or the like may be used as the angular velocity sensor. For example, a piezoresistive type acceleration sensor, a piezoelectric type acceleration sensor, or a capacitive type acceleration sensor may be used as the acceleration sensor. Further, for example, a geomagnetic sensor is used as the angle sensor. Further, the sensor 914 may include various measurement devices such as a thermometer, an illuminometer, a humidity meter, a speedometer, and an accelerometer, as well as those described above.

The input device 915 is an operation device used by a user such as, for example, a mouse, a keyboard, a touch panel, a button, a switch, or a lever. The input device 915 may be, for example, a remote control device that uses infrared rays or other radio waves, or an external connection device 929 such as a portable phone, a PDA, or the like, which is corresponding to the operation of the information processing device 900. The input device 915 includes, for example, an input control circuit that generates an input signal based on information input by a user using the operation device above and outputs the input signal to the CPU 901. The user of the information processing device 900 can, by operating the input device 915, input various data to the information processing device 900 or instruct the information processing device 900 to perform a processing operation.

The output device 917 includes a device which is capable of providing obtained information to a user in a visual or auditory manner. As such device, display devices including a CRT display device, a liquid crystal display device, a plasma display device, an EL display device and a lamp and the like; audio output devices such as speaker, head phone and the like; a printer unit; a mobile phone; a facsimile and the like are available. The output device 917 outputs, for example, a result obtained by various kinds of processing made by the information processing device 900. In particular, the display device displays the result of various kinds of processing made by the information processing device 900 in a form of text or an image. On other hand, an audio output device converts audio signals of reproduced voice data or acoustic data into analog signals and outputs the same.

The storage device 919 is a device for storing data, constructed as an example of a storage unit of the information processing device 900. The storage device 919 includes, for example, a magnetic storage device such as HDD (Hard Disk Drive), a semiconductor storage device, an optical storage device, or a magneto-optical storage device. This storage device 919 includes, for example, programs or various data executed by the CPU 901 or various data acquired from the outside.

The drive 921 is a reader/writer for record medium, which is included in the information processing device 900 or externally provided thereto. The drive 921 reads information recorded in a magnetic disk, an optical disk, a magnetic optical disk, or a removable recording medium 927 such as semiconductor memory or the like mounted thereon, and outputs the same to the RAM 905. The drive 921 can also write a record on a magnetic disk, an optical disk, a magnetic optical disk mounted thereon, or a removable recording medium 927 such as semiconductor memory or the like. The removable recording medium 927 may be, for example, a DVD media, a HD-DVD media, a Blu-ray media or the like. The removable recording medium 927 may be a Compact-Flash (registered mark), a flash memory, or an SD memory card (secure digital memory card) or the like. The removable recording medium 927 may be, for example, an IC card (integrated circuit card) mounted with non-contact IC chip or an electronic device.

The connection port 923 is a port for directly connecting a device to the information server 10. As an example of the connection port 923, a USB (universal serial bus) port, an IEEE 1394 port, an SCSI (small computer system interface) port and the like are available. As another example of the connection port 923, an RS-232C port, an optical audio terminal, an HDMI (high-definition multimedia interface) port and the like are available. By connecting the external connection device 929 to the connection port 923, the information server 10 obtains various kinds of data directly from the external connection device 929 and provides various kinds of data to the external connection device 929.

The communication device 925 is a communication interface including, for example, a communication device or the like for connecting to communication network 931. The communication device 925 may be, for example, a wired or wireless LAN (local area network), Bluetooth (registered mark) or a communication card for WUSB (Wireless USB) or the like. The communication device 925 may be a router for optical communication, a router for ADSL (asymmetric digital subscriber line) or a modem for various kinds of communication. The communication device 925 is capable of transmitting and receiving signals via, for example, Internet or other communication device in accordance with a predetermined protocol like, for example, TCP/IP. The communication network 931 connected to the communication device 925 may include a network or the like connected in a wired or wireless manner such as for example, Internet, a home LAN, an infrared communication, a radiofrequency communication or a satellite communication.

An example of hardware configurations capable of achieving the functions of the information processing device 900 according to the embodiment of the present disclosure has been described above. The above-described component elements may include a general purpose unit or circuit, or hardware each specialized to the functions of the component elements may be included. Therefore, the applied configuration may be appropriately changed in accordance with the technical art at the point when the embodiment is implemented.

(Remarks)

In the above description, the embodiment in which the information processing device is a smartphone and a manipulation is input by contact of the user with the display has been described. However, as described above, the information processing device may be, for example, a tablet PC, a PDA (Personal Digital Assistant), or any media player. Further, the manipulation input of the information processing device may not necessarily be performed by the contact with the display.

Further, even when the manipulation input is performed by the contact with the display, a predetermined user manipulation for causing an interaction between the first icon and the first area may be any manipulation. While in the above description, the press and hold manipulation, or the drag manipulation to move the contact position in a press and hold state has been illustrated, various other manipulations such as a flick manipulation may be set as the predetermined user manipulation.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) An information processing apparatus comprising: a processor that receives an output from a user interface indicating that a first icon is selected; acquires sensor information corresponding to movement of the information processing apparatus; and controls a display to move at least a second icon on the display based on the acquired sensor information corresponding to the movement of the information processing apparatus upon receiving the output from the user interface that the first icon is selected.

(2) The information processing apparatus of (1), further comprising: the user interface including a display that displays the first and second icons and that detects a user input selecting the first icon.

(3) The information processing apparatus of (2), further comprising: a touch panel formed on, or integrally with, the display of the user interface that detects a touch input as the user input selecting the first icon.

(4) The information processing apparatus of (3), wherein the processor determines from the output of the user interface that the touch input selecting the first icon has been continuously detected for greater than a predetermined period of time, and acquires the sensor information and controls the display to move at least the second icon based on the determination.

(5) The information processing apparatus of any one of (3) and (4), wherein the processor determines, based on an output from the user interface, that the touch input is a drag touch input, and controls the display to move the first icon in response to the drag touch input.

(6) The information processing apparatus of (5), wherein the processor determines that, as a result of the drag touch input, the first icon overlaps the second icon on the display, and controls a predetermined process relating to both the first icon and the second icon to be performed based on the determination.

(7) The information processing apparatus of any one of (3) to (6), wherein the processor determines, based on an output from the user interface, that the touch input is a drag touch input, and acquires the sensor information and controls the display to move at least the second icon based on the determination.

(8) The information processing apparatus of any one of (1) to (7), wherein the sensor information corresponding to the movement of the information processing apparatus corresponds to a change in tilt or slope of the information processing apparatus, and the processor controls the display to move the second icon on the display based on the change in tilt or slope of the information processing apparatus.

(9) The information processing apparatus of (8), wherein the processor controls the display to move the second icon on the display a distance determined based on the change in tilt or slope of the information processing apparatus.

(10) The information processing apparatus of any one of (8) and (9), wherein the processor controls the display to move the second icon on this display a distance that is in proportion to the change in tilt or slope of the information processing apparatus.

(11) The information processing apparatus of any one of (8) to (10), wherein the processor controls the display to stop moving the second icon on the display when the sensor information indicates that there is no further change in slope or tilt of the information processing apparatus.

(12). The information processing apparatus of any one of (8) to (10), wherein the processor controls the display to continue moving the second icon on the display when the sensor information indicates that there is no further change in slope or tilt of the information processing apparatus.

(13) The information processing apparatus of any one of (8) to (12), further comprising: a sensor unit that detects the change in tilt or slope of the information processing apparatus and outputs the detected change in tilt or slope as the sensor information corresponding to the movement of the information processing apparatus.

(14) The information processing apparatus of any one of (1) to (13), wherein the processor determines that, as a result of the movement of the second icon on the display based on the acquired sensor information, the first icon overlaps the second icon on the display, and controls a predetermined process relating to both the first icon and the second icon to be performed based on the determination.

(15) The information processing apparatus of any one of (1) to (14), wherein the processor determines that, as a result of the movement of the second icon on the display based on the acquired sensor information, the first icon is in a predefined area surrounding the second icon on the display, and controls a predetermined process relating to both the first icon and the second icon to be performed based on the determination.

(16) The information processing apparatus of any one of (3) to (15), wherein the processor determines that, as a result of the movement of the second icon on the display based on the acquired sensor information, the first icon overlaps the second icon on the display, and that the touch input is no longer detected by the touch panel, and controls a predetermined process relating to both the first icon and the second icon to be performed based on the determination.

(17) The information processing apparatus of any one of (1) to (16), wherein the first icon corresponds to content data.

(18) The information processing apparatus of any one of (1) to (17), wherein the second icon corresponds to another information processing apparatus remotely connected to the information processing apparatus.

(19) The information processing apparatus of any one of (1) to (18), wherein the first icon corresponds to content data, the second icon corresponds to another information processing apparatus remotely connected to the information processing apparatus and capable of reproducing the content data, and the processor determines that, as a result of the movement of the second icon on the display based on the acquired sensor information, the first icon is in a predefined area surrounding the second icon on the display, and instructs the another information processing apparatus to reproduce the content data based on the determination.

(20) The information processing apparatus of any one of (1) to (19), wherein the second icon corresponds to an application capable of being executed by the information processing apparatus.

(21) The information processing apparatus of any one of (1) to (20), wherein the first icon corresponds to content data, the second icon corresponds to an application capable of being executed by the information processing apparatus to access an internet-based application, and the processor determines that, as a result of the movement of the second icon on the display based on the acquired sensor information, the first icon is in a predefined area surrounding the second icon on the display, and controls the content data to be uploaded to the internet-based application based on the determination.

(22) The information processing apparatus of any one of (1) to (21), wherein the first icon is displayed in a lower portion of the display and the second icon is displayed in an upper portion of the display.

(23) A method performed by an information processing apparatus, the method comprising: receiving an output from a user interface indicating that a first icon is selected; acquiring sensor information corresponding to movement of the information processing apparatus; and controlling a display to move at least a second icon on the display based on the acquired sensor information corresponding to the movement of the information processing apparatus upon receiving the output from the user interface that the first icon is selected.

(24) A non-transitory computer-readable medium including computer-program instructions, which when executed by an information processing apparatus, cause the information processing apparatus to perform a process comprising: receiving an output from a user interface indicating that a first icon is selected; acquiring sensor information corresponding to movement of the information processing apparatus; and controlling a display to move at least a second icon on the display based on the acquired sensor information corresponding to the movement of the information processing apparatus upon receiving the output from the user interface that the first icon is selected.

REFERENCE SIGNS LIST

100 Information processing device
110 Housing
120 Display
130 Touch panel
140 Display control unit
150 Position setting unit
160 Control unit
170 Slope reference value acquisition unit
180 Slope detection unit
190 Slope change acquisition unit
1201 Screen
1203 First icon
p1 Position of first icon
1205 First area
p2 Position of first area
1207 Second icon

The invention claimed is:

1. An information processing apparatus comprising:
a processor configured to:
receive a touch output from a user interface indicating that a first icon is selected;
acquire sensor information corresponding to movement of the information processing apparatus, wherein the sensor information corresponding to the movement of the information processing apparatus corresponds to a change in tilt or slope of the information processing apparatus:
control a display to initiate display of a second icon in a peripheral region on the display by moving the second icon onto the display and move at least the second icon from an original position in the peripheral region on the display toward the first icon based on the change in tilt or slope of the information processing apparatus while receiving the touch output from the user interface that the first icon is selected, wherein the second icon is not displayed before the sensor information is acquired; and
irrespective of the tilt or slope of the information processing apparatus, control the display to move the second icon to the original position in the peripheral region on the display in response to the second icon overlapping the first icon, which disappears following a release of a press and hold manipulation when the second icon and the first icon are overlapping, as a result of the movement of the second icon corresponding to the movement of the information processing apparatus.

2. The information processing apparatus of claim 1, wherein
the user interface includes the display that displays the first and second icons and that detects a user input selecting the first icon.

3. The information processing apparatus of claim 2, further comprising:
a touch panel formed on, or integrally with, the display of the user interface that detects a touch input as the user input selecting the first icon.

4. The information processing apparatus of claim 3, wherein
the processor determines from the output of the user interface that the touch input selecting the first icon has been continuously detected for greater than a predetermined period of time, and acquires the sensor information and controls the display to move at least the second icon based on the determination.

5. The information processing apparatus of claim 3, wherein
the processor determines, based on an output from the user interface, that the touch input is a drag touch input, and controls the display to move the first icon in response to the drag touch input.

6. The information processing apparatus of claim 5, wherein
the processor determines that, as a result of the drag touch input, the first icon overlaps the second icon on the display, and controls a predetermined process relating to both the first icon and the second icon to be performed based on the determination.

7. The information processing apparatus of claim 3, wherein
the processor determines, based on an output from the user interface, that the touch input is a drag touch input, and acquires the sensor information and controls the display to move at least the second icon based on the determination.

8. The information processing apparatus of claim 1, wherein
the processor controls the display to move the second icon on the display a distance determined based on the change in tilt or slope of the information processing apparatus.

9. The information processing apparatus of claim 1, wherein
the processor controls the display to move the second icon on the display a distance that is in proportion to the change in tilt or slope of the information processing apparatus.

10. The information processing apparatus of claim 1, wherein
the processor controls the display to stop moving the second icon on the display when the sensor information indicates that there is no further change in slope or tilt of the information processing apparatus.

11. The information processing apparatus of claim 1, wherein
the processor controls the display to continue moving the second icon on the display when the sensor information indicates that there is no further change in slope or tilt of the information processing apparatus.

12. The information processing apparatus of claim 1, further comprising:
a sensor that detects the change in tilt or slope of the information processing apparatus and outputs the detected change in tilt or slope as the sensor information corresponding to the movement of the information processing apparatus.

13. The information processing apparatus of claim 1, wherein
the processor determines that, as a result of the movement of the second icon on the display based on the acquired sensor information, the first icon overlaps the second icon on the display, and controls a predetermined process relating to both the first icon and the second icon to be performed based on the determination.

14. The information processing apparatus of claim 1, wherein
the processor determines that, as a result of the movement of the second icon on the display based on the acquired sensor information, the first icon is in a predefined area surrounding the second icon on the display, and controls a predetermined process relating to both the first icon and the second icon to be performed based on the determination.

15. The information processing apparatus of claim 3, wherein
the processor determines that, as a result of the movement of the second icon on the display based on the acquired sensor information, the first icon overlaps the second icon on the display, and that the touch input is no longer detected by the touch panel, and controls a predetermined process relating to both the first icon and the second icon to be performed based on the determination.

16. The information processing apparatus of claim 1, wherein
the first icon corresponds to content data.

17. The information processing apparatus of claim 1, wherein
the second icon corresponds to another information processing apparatus remotely connected to the information processing apparatus.

18. The information processing apparatus of claim 1, wherein
the first icon corresponds to content data, the second icon corresponds to another information processing apparatus remotely connected to the information processing apparatus and capable of reproducing the content data, and
the processor determines that, as a result of the movement of the second icon on the display based on the acquired sensor information, the first icon is in a predefined area surrounding the second icon on the display, and instructs the another information processing apparatus to reproduce the content data based on the determination.

19. The information processing apparatus of claim 1, wherein
the second icon corresponds to an application capable of being executed by the information processing apparatus.

20. The information processing apparatus of claim 1, wherein
the first icon corresponds to content data,
the second icon corresponds to an application capable of being executed by the information processing apparatus to access an internet-based application, and
the processor determines that, as a result of the movement of the second icon on the display based on the acquired sensor information, the first icon is in a predefined area surrounding the second icon on the display, and controls the content data to be uploaded to the internet-based application based on the determination.

21. The information processing apparatus of claim 1, wherein
the first icon is displayed in a lower portion of the display and the second icon is displayed in an upper portion of the display.

22. A method performed by an information processing apparatus, the method comprising:
receiving a touch output from a user interface indicating that a first icon is selected;
acquiring sensor information corresponding to movement of the information processing apparatus, wherein the sensor information corresponding to the movement of the information processing apparatus corresponds to a change in tilt or slope of the information processing apparatus;

controlling a display to initiate display of a second icon in a peripheral region on the display by moving the second icon onto the display and move at least the second icon from an original position in the peripheral region on the display toward the first icon based on the change in tilt or slope of the information processing apparatus while receiving the touch output from the user interface that the first icon is selected, wherein the second icon is not displayed before the sensor information is acquired; and irrespective of the tilt or slope of the information processing apparatus, controlling the display to move the second icon to the original position in the peripheral region on the display in response to the second icon overlapping the first icon, which disappears following a release of a press and hold manipulation when the second icon and the first icon are overlapping, as a result of the movement of the second icon corresponding to the movement of the information processing apparatus.

23. A non-transitory computer-readable medium including computer-program instructions, which when executed by an information processing apparatus, cause the information processing apparatus to perform a process comprising:

receiving a touch output from a user interface indicating that a first icon is selected;

acquiring sensor information corresponding to movement of the information processing apparatus, wherein the sensor information corresponding to the movement of the information processing apparatus corresponds to a change in tilt or slope of the information processing apparatus;

controlling a display to initiate display of a second icon in a peripheral region on the display by moving the second icon onto the display and move at least the second icon from an original position in the peripheral region on the display toward the first icon based on the change in tilt or slope of the information processing apparatus while receiving the touch output from the user interface that the first icon is selected, wherein the second icon is not displayed before the sensor information is acquired; and irrespective of the tilt or slope of the information processing apparatus, controlling the display to move the second icon to the original position in the peripheral region on the display in response to the second icon overlapping the first icon, which disappears following a release of a press and hold manipulation when the second icon and the first icon are overlapping, as a result of the movement of the second icon corresponding to the movement of the information processing apparatus.

24. The information processing apparatus of claim 1, wherein the second icon is moved only while receiving continuous selection of the first icon from the user interface.

* * * * *